United States Patent [19]

Petrie

[11] Patent Number: 4,687,399

[45] Date of Patent: Aug. 18, 1987

[54] RETAINING RINGS INCLUDING ORIENTING SLOT AND HOLE CONFIGURATIONS, AND APPARATUS AND METHOD OF RING ORIENTATION

[76] Inventor: John A. Petrie, 1031 Carew Tower, Cincinnati, Ohio 45202

[21] Appl. No.: 816,414

[22] Filed: Jan. 6, 1986

[51] Int. Cl.$^4$ ............................................. F16B 21/18
[52] U.S. Cl. .................................... 411/518; 403/326
[58] Field of Search .............................. 411/516-518; 403/155, 326; 285/321

[56] References Cited

U.S. PATENT DOCUMENTS

| | | | |
|---|---|---|---|
| 2,595,787 | 5/1952 | Heimann | 411/518 |
| 3,469,494 | 9/1969 | Frailly | 411/517 |
| 3,535,977 | 10/1970 | Baumgarten | 403/326 |
| 3,701,303 | 10/1972 | Kondo | 411/518 |

*Primary Examiner*—James L. Ridgill, Jr.
*Attorney, Agent, or Firm*—Renner, Otto, Boisselle & Lyon

[57] ABSTRACT

A retaining ring includes a hole in one end and a slot in the other end for use in determining the orientation of the ring. Such orientation is accomplished by randomly placing a plurality of such rings on a rail for similarly shaped member and advancing the rings along the rail until the holes or slots in the rings pass over a sorting rod. The rings with the holes engaged by the sorting rod are supported by the rod for transfer to another station such as another rail where a stack of the rings may be taped together. The rings with the slots engaged by the sorting rod with fall off the sorting rod in a controlled manner, and may be transferred onto another rail or other suitable support for orienting the other rings in the opposite direction to those which remained on the sorting rod for securing together in stacked relation similar to the rod oriented rings.

5 Claims, 8 Drawing Figures

RETAINING RINGS INCLUDING ORIENTING SLOT AND HOLE CONFIGURATIONS, AND APPARATUS AND METHOD OF RING ORIENTATION

BACKGROUND OF THE INVENTION

This invention relates generally as indicated to retaining rings each having an orienting slot and hole in opposite ends for orienting the rings, and to apparatus and method of orienting such rings utilizing such slot and hole configurations.

Single beveled retaining rings are used to provide rigid end-play takeup in machine assemblies and other applications where manufacturing tolerances and/or part wear cause end-play between the abutting surfaces of the ring and the retained part. Such a beveled ring is similar to a standard split retaining ring except that a surface portion thereof received in the groove is beveled, usually to a 15° angle. The ring retention groove has a corresponding bevel on the load bearing groove wall to seat the received beveled surface, and the beveled ring surface is generally seated at least half way into the groove to provide sufficient contact area with the load bearing groove wall while allowing for adequate end-play takeup.

Beveled retaining rings may be of the internal or external type with the beveled edge located around the outer circumference of the former and around the inner circumference of the latter. Usually, the rings are of the tapered section type with their section heights decreasing progressively from the ring mid-section to the free ends thereof so that the rings maintain circularity under deformation, i.e. when spread in the case of the external rings and contracted in the case of the internal rings.

One problem that has arisen from the use of single beveled retaining rings is the possibility of the rings being inserted backwards in a ring retention groove such that the beveled surface engages the retained part rather than the inclined groove wall. Such a backwardly mounted single beveled retaining ring will not function properly.

One way of eliminating backwardly mounted retaining rings has been to bevel both sides of the retaining rings. However, because of some inherent problems in the design and function of double beveled retaining rings, there is still a need for an economical and practical way of orienting single beveled retaining rings.

Also, occasionally there is a requirement in the industry for a flat or non-beveled ring to be oriented to maximize load capacity by controlling the direction of the radius side versus the sharp side created by the blanking operation.

Previously, it has been known to provide eccentric lugs on standard single beveled retaining rings for use in orienting the rings. However, the actual equipment required to orient the rings is quite cumbersome and slow, making this procedure impractical.

SUMMARY OF THE INVENTION

With the foregoing in mind, it is a principal object of this invention to provide novel split retaining rings that can easily and economically be oriented.

Another object is to provide a novel method of orienting such retaining rings.

These and other objects of the present invention may be achieved by providing each retaining ring with a hole in one end and a slot in the other end for use in determining the orientation of the ring. Briefly, this is accomplished in accordance with the present invention by randomly placing the rings on a rail or similarly shaped member and advancing the rings along the rail until the holes or slots in one end of the rings pass over a wire or thin sorting rod. The rings with the holes in the ends engaged by the sorting rod will be supported by the rod for transfer to another station such as another rail where a stack of the rings may be taped together. The rings with the slots in the ends engaged by the sorting rod, on the other hand, will fall off the sorting rod in a controlled manner, and may be transferred onto another rail or other suitable support for orienting the other rings in the opposite direction to those which remained on the rod for taping in stacked relation similar to the rod oriented rings.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figure 1:
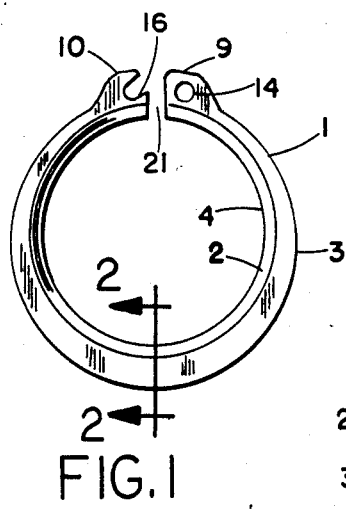
FIG. 1 is a side elevation view of a preferred form of external single beveled retaining ring in accordance with this invention including an orienting slot and hole in opposite ends thereof for use in orienting the bevel.
Figure 3:
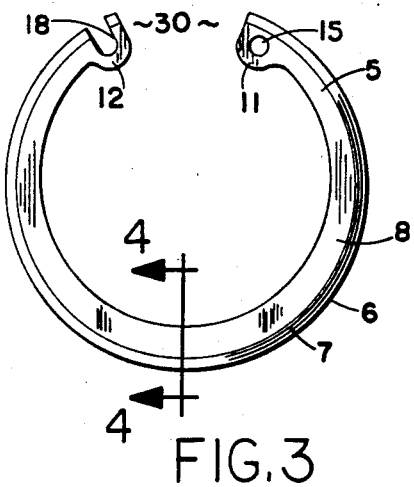
FIG. 3 is a side elevation view of a preferred form of internal single beveled retaining ring in accordance with this invention which also includes an orienting slot and hole in opposite ends thereof for use in orienting the bevel.
Figure 2:
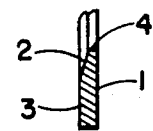
FIG. 2 is a transverse section through the retaining ring of FIG. 1, taken generally along the plane of the line 2—2 thereof.
Figure 4:
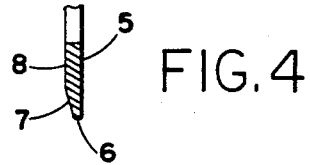
FIG. 4 is a transverse section through the retaining ring of FIG. 3, taken generally along the plane of the line 4—4 thereof.

Referring now in detail to the drawings and initially to FIGS. 1 and 2, there is shown an external retaining ring 1 of the single bevel type including an open-ended ring body of spring material which has a varying or tapering cross section and a bevel 2 on one side 3 of an inner groove seating edge 4 of the ring. FIGS. 3 and 4 show an internal retaining ring 5 which is very similar to the external retaining ring 1 shown in FIGS. 1 and 2 except that the ring 5 has an outer groove seating edge 6 with a bevel 7 on one side 8 rather than an inner groove seating edge. During use, the rings 1, 5 are respectively installed in an external and internal annular groove of an assembly to retain a component of the assembly in a manner well known in the art. The bevel surface 2, 7 engages an inclined wall of the groove whereby the ring 1, 5 is wedged in an axial direction to press the component firmly against a wall of the assembly to eliminate any axial looseness or end play of the component, as well known in the art.

Typically, tapered retaining ring designs are provided with lugs or plier hole sections at the ends of the rings in order to allow for the punching of holes through the ends of the rings for engagement by the tips of retaining ring pliers that are used to contract internal rings and expand external rings during assembly into the respective ring receiving grooves.

For other retaining ring designs, such as uniform section rings, it becomes virtually impossible to include punched holes in the ends of the rings because of the ring section and thickness and their relationship to one another. Accordingly, in rings of this type, plier engaging notches are generally provided in both ends of the rings for engagement by the tips of the pliers, with the angles of the notches being oriented to allow for either compression or expansion of the rings depending on whether the rings are of the internal or external type. Also, on some relatively small, thick tapered retaining rings, similar type notches or reliefs are provided in both ends of the rings for use in contracting or expanding the rings.

The retaining rings 1, 5 of the present invention, like those of the conventional tapered ring designs, desirably include enlarged sections or lugs 9, 10 and 11, 12 at both ends. In the case of the external ring 1 shown in FIG. 1, the lugs 9, 10 extend generally radially outwardly from the ends of the ring, whereas in the case of the internal ring 5 shown in FIG. 3, the lugs 11, 12 extend generally radially inwardly of the ring. One of the lugs 9 and 11 of each pair 9, 10 and 11, 12 includes the usual plier hole 14 and 15 therein, formed as by a punching operation. The other lug 10 and 12, on the other hand, instead of having a plier hole therein, is slotted from the radial outer edge toward the inner edge of the lug for a purpose to be subsequently described.

In the case of the external ring 1 shown in FIG. 1, the slot 16 in the lug 10 extends from the radial outer edge of the lug toward the inner edge at an angle away from the outer lug 9 so that a standard ring pliers can still be used to engage the hole 14-slot 16 combination to spread (expand) the ring. In the case of the internal ring 5 shown in FIG. 3, the slot 18 extends from the radial outer edge of the lug 12 through the bevel 7 and in a more radial direction or at an angle toward the other lug 11 so that the tips of the pliers can also be used to engage both the hole 15 in the one lug 11 and the notch 18 in the other lug 12 for contracting the internal ring 5. The holes and slots are desirably formed in the ends of the rings 1, 5 at a time during the manufacturing process in which the tapers 2, 7 of the rings always face in the same direction so that the holes and slots are always in the same ends when the rings are oriented with the bevels facing in the same direction. Such a hole and slot combination provides a simple and economical way of orienting the beveled sides of such single beveled retaining rings 1, 5, as described hereafter.

Heretofore, it was known to provide single beveled retaining rings with an eccentric lug design for orienting the rings. However, this involved the use of relatively expensive equipment which was cumbersome and slow in comparison to the present invention, which involves the use of a sorting rod or wire to pick off the properly oriented rings and sort out the non-oriented rings from the oriented rings as described hereafter.

The rings 1, 5 of the present invention may initially be stored in a hopper. Also, a standard release mechanism (not shown) may be used to separate the rings and feed the rings onto a rail schematically shown at 20 in FIG. 5 and 20' in FIG. 8. The rail 20 (or 20') may be of any desired length and desirably extends at a slight downward angle to facilitate movement of the rings along the rail by gravity. Also, the rings may be moved along the rail by vibrating the rail and/or by using a mechanical pusher to push the rings along the rail.

Figure 8:
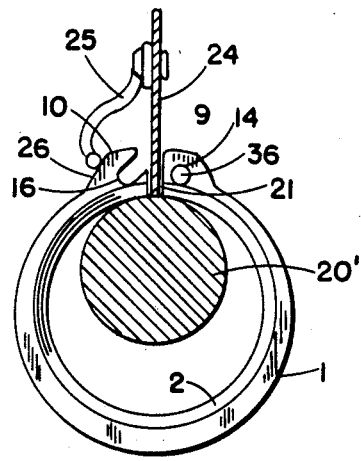
FIG. 8 is an enlarged transverse section through another form of guide rail which may be used to support and orient the holes or slots in one end of a plurality of external single beveled retaining rings of the type shown in FIG. 1.

For orienting the external retaining rings 1 of the present invention in which the lugs 9, 10 extend generally radially outward from the ends of the rings, a round rail 20' such as schematically shown in FIG. 8 may be used to support the rings, with a suitable guide 24 extending longitudinally along the top of the rail and into the gap 21 between the ends of the rings, and a guide arm 25 adapted to engage the side 26 of one of the lugs which is remote from the gap for maintaining one of the lugs in sliding contact with one side of the guide.

Figure 6:
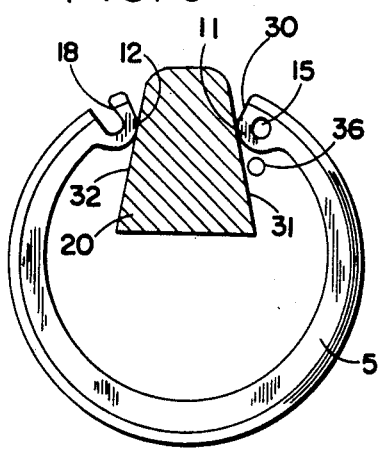
FIGS. 6 and 7 are enlarged transverse sections through one form of guide rail which may be used to support and locate the holes or slots in one end of a plurality of internal single beveled retaining rings of the type shown in FIG. 3.
Figure 7:
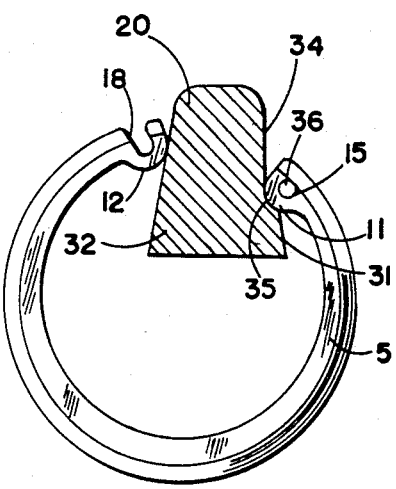

For orienting the internal retaining rings 5, in which the lugs 11, 12 extend generally radially inwardly from the ends of the rings and the gap 30 between the ends of the rings is much larger, the rail 20 is desirably provided with sloping sides 31, 32 which progressively slope away from each other from top to bottom as shown in FIGS. 6 and 7. Also, one of the tapered sides 31 desirably has a progressively inwardly tapering groove 34 along a portion of the length thereof to compensate for the ring gap 30 tolerances which result when the rings 5 are heat treated. Such heat treatment causes some distortion of the rings, whereby the gap dimension, or dimension between the center lines of the plier hole 15 and slot 18 is not always constant. The downwardly and inwardly sloping tapered side groove 34 of the rail 20 forms a rounded shoulder 35 against which the rounded edge of one of the lugs 11, 12 settles (see FIG. 7) as the rings are vibrated or otherwise moved along the rail to compensate for the gap tolerance while positively positioning the plier hole 15 or slot 18 on such one side at a predetermined height for feeding onto a sorting wire or thin rod 36.

Figure 5:
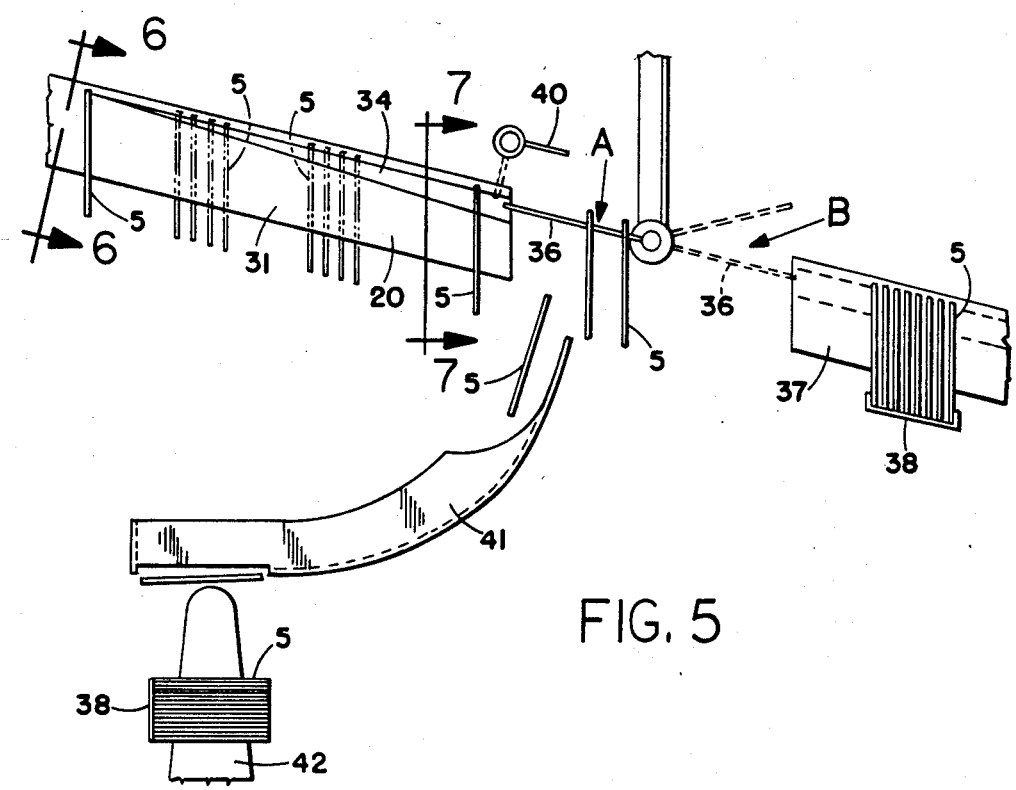
FIG. 5 is a schematic illustration showing how the orienting slots and holes in the ends of the retaining rings can be utilized to orient the rings so that the bevels on the oriented rings all face in the same direction.

As schematically illustrated in FIG. 5, the sorting rod 36 is mounted for pivotal swinging movement between a first end position A slightly axially overlapping the outer end of the rail 20 (or 20') in line with the holes or slots in one side of the rings and a second position B slightly axially overlapping the end of another rail 37 spaced from the first rail. When the sorting rod 36 is in the first position axially overlapping the end of the first rail 20, the rings 5 that are advanced along the first rail will pass on the rod and either be retained thereby or drop off depending on whether the lug with the hole or slot is in alignment with the rod. The rings with the holes in alignment with the sorting rod will be retained on the rod with the bevels all facing in the same direction until the rod is full, whereupon the rod may be rotated to a second position to deposit the oriented rings at another station, for example, onto the second rail 37, where the oriented rings may be secured together in stacked relation as by taping the rings together with tape 38 along the outer edge thereof opposite the gap 30.

The number of rings that can be supported along the sorting rod at any given time will depend on the length of the rod as well as the weight and thickness of the rings. Also, the extent to which the rod is pivoted may vary depending on various factors. For example, the rod may be pivoted 180° to bring it into line with another rail substantially in line with the first rail but spaced therefrom, or pivoted more or less depending on the location of the other rail relative to the first rail. Also, when the sorting rod 36 is in the first position at the end of the first rail 20, the sorting rod desirably extends upwardly at a slight angle which may correspond to the angle of inclination of the first rail to receive the rings from the first rail and maintain the rings on the sorting rod during transfer to the second rail, at which time the sorting rod may be angled downwardly to permit the rings to slide off the sorting rod onto the second rail, and so on. Also, a pivotable stop 40 is desirably provided adjacent the end of the first rail 20 or 20' to prevent the rings 5 or 1 from sliding off the first rail when the sorting rod 36 is swung away from the first rail.

The retaining rings 5 on the first rail 20 with the slots 18 in alignment with the sorting rod 36 will of course fall off the sorting rod, and may be caught in a controlled fashion so as to maintain the orientation of the non-supported rings in the opposite direction to those which remain on the sorting rod as by providing a conveyor or guide 41 which guides the non-supporting rings onto another rail or spindle 42 for stacking of the non-supported rings and taping of the non-supported rings together in the desired oriented position. Alternatively, the non-supported rings that drop off the sorting rod may be recycled for further sorting and orientation in the manner previously described.

While the retaining rings shown are of the single bevel type, it will be appreciated that the same hole and slot configurations can be provided in the ends of other types of split retaining rings which have different surface configurations on opposite sides for use in orienting such rings in the manner previously described so that they all face in the same direction. For example, such hole and slot configurations can be provided in the ends of flat or non-beveled rings for use in orienting these latter rings so that the radius sides versus the sharp sides of the rings created by the blanking operation face in the same direction to maximize load capacity.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A plurality of retaining rings each comprising an open-ended body of spring material having spaced apart ends and differently configured opposite sides, and orienting means at said ends for use in sorting the rings which have one side facing in one direction from the rings which have the opposite side facing in the opposite direction, said orienting means comprising hole means in one of said ends and open slot means in the other of said ends, said hole means in the rings having one side facing in one direction being engageable with a sorting element for retention of the rings facing in such one direction on the sorting element, and said slot means in the rings having the opposite side facing in the opposite direction being engageable with the sorting element to permit the rings facing in the opposite direction to fall off the sorting element.

2. The retaining rings of claim 1 wherein said slot means opens to the outer edge of each said ring body.

3. The retaining rings of claim 2 wherein the ends of each said ring body have lugs thereon in which said hole means and slot means are respectively formed.

4. The retaining rings of claim 3 which are external retaining rings each including an inner groove seating edge, each said ring body having a bevel on one side only, said bevel being formed on said one side of each said ring body along said inner groove seating edge, and said lugs extending generally radially outwardly from the ends of each said ring body, said slot means in one of said lugs extending from the radial outer edge of said one lug toward the inner edge of said one lug at an angle away from the other lug.

5. The retaining rings of claim 4 which are internal retaining rings each including an outer groove seating edge, each said ring body having a bevel on one side only, said bevel being formed on one side of each said ring body along said outer groove seating edge, and said lugs extending generally radially inwardly from the ends of each said ring body, said slot means in one of said lugs extending from the radial outer edge of said one lug in a generally radial direction or at an angle toward the other lug.

* * * * *